US011475352B2

(12) United States Patent
Zhang (10) Patent No.: US 11,475,352 B2
(45) Date of Patent: Oct. 18, 2022

(54) QUANTIZING MACHINE LEARNING MODELS WITH BALANCED RESOLUTION VIA DAMPED ENCODING

(71) Applicant: ALIBABA GROUP HOLDING LIMITED, Grand Cayman (KY)

(72) Inventor: Weifeng Zhang, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 927 days.

(21) Appl. No.: 16/183,699

(22) Filed: Nov. 7, 2018

(65) Prior Publication Data

US 2020/0143282 A1    May 7, 2020

(51) Int. Cl.
*G06N 20/00* (2019.01)
*G06F 7/483* (2006.01)
*G06N 5/04* (2006.01)

(52) U.S. Cl.
CPC ............. *G06N 20/00* (2019.01); *G06F 7/483* (2013.01); *G06N 5/04* (2013.01)

(58) Field of Classification Search
CPC .......... G06N 20/00; G06N 5/04; G06N 3/063; G06F 7/483; G06F 7/49936
See application file for complete search history.

(56) References Cited

U.S. PATENT DOCUMENTS

| | | | |
|---|---|---|---|
| 2016/0328646 A1* | 11/2016 | Lin | G06K 9/4628 |
| 2018/0350109 A1* | 12/2018 | Pan | H04N 19/172 |
| 2019/0122100 A1* | 4/2019 | Kang | G06F 7/49957 |
| 2019/0171927 A1* | 6/2019 | Diril | G06N 3/04 |
| 2019/0294413 A1* | 9/2019 | Vantrease | G06F 7/5443 |
| 2019/0340492 A1* | 11/2019 | Burger | G06N 3/08 |
| 2020/0134324 A1* | 4/2020 | Zeng | G06K 9/00791 |

OTHER PUBLICATIONS

Warden, "How to Quantize Neural Networks with TensorFlow", 2016. (Year: 2016).*
Jacob, "Quantization and Training of Neural Networks for Efficient Integer-Arithmetic-Only Inference", 2017. (Year: 2017).*

* cited by examiner

*Primary Examiner* — Dave Misir
(74) *Attorney, Agent, or Firm* — Finnegan, Henderson, Farabow, Garrett & Dunner, LLP (57) ABSTRACT

A method for quantizing a machine learning model during an inference phase, including determining a normalization factor using a set of floating-point values and a damped value of a damped value sequence; and assigning a quantized value for each floating-point value of the set of floating-point values based on the damped value sequence and the normalization factor.

18 Claims, 6 Drawing Sheets

QUANTIZING MACHINE LEARNING MODELS WITH BALANCED RESOLUTION VIA DAMPED ENCODING

BACKGROUND

Inference efficiency is becoming increasingly important in the fields of machine learning and deep learning. To accelerate inference using a pre-trained neural network model, quantization techniques are often used to transform high precision floating-point numbers in the model into low precision fixed-point numbers. Because neural networks often treat precision loss, due to low precision representation, as a source of noise, quantization techniques are preferred because the techniques are robust enough to recognize key features of the networks and produce accurate results. Quantization techniques are also preferred to run interference on embedded processors and on a system of interrelated computing devices commonly termed Internet of Things that usually have limited computation resources and cannot handle floating-point numbers well.

Quantization techniques have multiple benefits, such as aiding in a reduced power consumption. For example, shrinking the file sizes of models stored in external space, lowering the DRAM usage of models loaded in memory, reducing the communication bandwidth during transfer of models, or speeding up the inference of models with parallel computation via single instruction multiple data (SIMD) instructions. All these improvements also lead to the secondary improvement of reduced power consumption when using quantization techniques.

However, a lot of machine learning applications are sensitive to even minor precision losses. As the number of bits used in quantization lowers, inference accuracy often deteriorates. As a result, using quantization techniques is often a trade-off between inference efficiency and inference accuracy.

SUMMARY

The present disclosure provides a method for quantizing floating-point values of a set of floating-point values. The method includes determining a normalization factor using a set of floating-point values and a damped value of a damped value sequence; and assigning a quantized value for each floating-point value of the set of floating-point values based on the damped value sequence and the normalization factor.

Consistent with some embodiments, the present disclosure further provides a non-transitory computer readable medium that stores a set of instructions that are executable by a processor device to cause the processor device to perform a method for quantizing floating-point values of a set of floating-point values. The method includes determining a normalization factor using a set of floating-point values and a damped value of a damped value sequence; and assigning a quantized value for each floating-point value of the set of floating-point values based on the damped value sequence and the normalization factor.

Consistent with some embodiments, the present disclosure further provides a quantizer for quantizing floating-point values of a set of floating-point values. The quantizer includes a memory storing one or more floating-point values of a set of floating-point values; normalization factor determination circuitry configured to determine a normalization factor using a set of floating-point values and a damped value of a damped value sequence; and quantization circuitry configured to assign a quantized value for each floating point value of the set of floating point values based on the damped value sequence and the normalization factor.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Modern day electronics hardware chiefly deal with two types of numbers: integers and floating-point. Both types of numbers are composed of a fixed number of bits, meaning that for k bits, each type of number can represent exactly $2^k$ values. However, what exactly those values represent vary between the formats. For integer numbers, the k bits are divided into two groups: sign and magnitude. The first group is simply the first bit, called the sign bit, which is interpreted as the sign of the number, i.e., whether the number is negative or positive. The other k−1 bits, collectively called the magnitude, are interpreted as integers representing the absolute value of the number, i.e., $\{0, 1, \ldots (2^{k-1}-1)\}$. Thus, a given k-bit integer $\{b_0 b_1 \ldots b_{k-1}\}$ can represent exactly the integers $\{-2^{k-1}, (-2^{k-1}+1), \ldots, -1, 0, 1, \ldots, (2^{k-1}-1)\}$. However, it is appreciated that, because of efficiency reasons not relevant here, the literal order of the integers represented by the bit sequences $\{\{00 \ldots 0\}, \{00 \ldots 1\}, \{00 \ldots 10\} \ldots, \{11 \ldots 1\}\}$ is actually $\{0, 1, \ldots, (2^{k-1}-1), -2^{k-1}, (-2^{k-1}+1), \ldots, -1\}$ (i.e., two's complement).

Figure 5A:
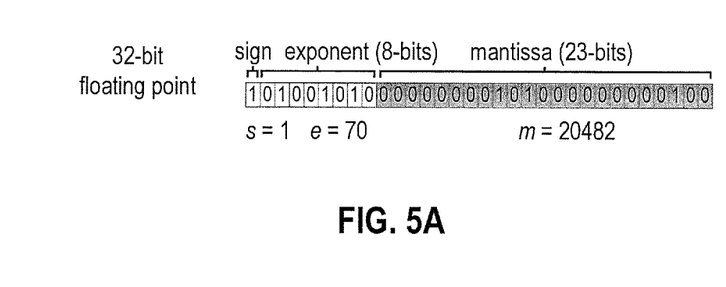
FIG. 5A illustrates an exemplary representation of a 32-bit floating-point number, consistent with embodiments of the present disclosure.
Figure 5B:
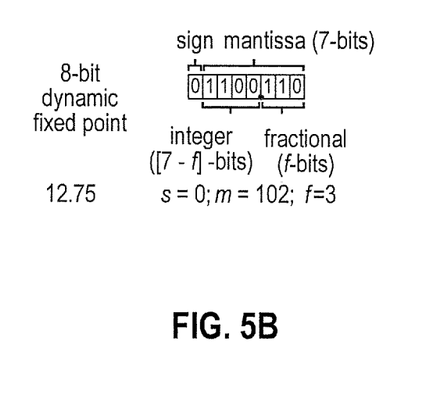
FIG. 5B illustrates an exemplary representation of an 8-bit dynamic fixed-point number, consistent with embodiments of the present disclosure.

Floating-point numbers, in contrast, are interpreted differently. Here, the k bits are split into three groups: sign, exponent, and mantissa. Like before, the first group is composed of the first bit, again called the sign bit, which is interpreted as the sign of the number. Unlike before, the next p bits (p≤(k−1)), collectively called the exponent, represent integer powers of $2\{2^{(-2^{p-1}+1)}, \ldots, 2^{-1}, 2^0, 2^1, \ldots, 2^{(2^{p-1})}\}$, which is interpreted as the magnitude of the number (i.e., determines where the decimal point is). Finally, the remaining q bits (q≤(k−p−1)), collectively called the mantissa, represent integers divided by $$2^q \left\{ \frac{0}{2^q}, \frac{1}{2^q}, \ldots \frac{(2^q-1)}{2^q} \right\},$$

which is interpreted as representing the significant digits of the number. The number itself is obtained simply by multiplying the mantissa with the exponent, with its sign being determined by the sign bit. This also explains the origins of the name "floating-point numbers", since, depending on the value of the exponent, the decimal point "floats" or varies on where it is placed vis-à-vis the mantissa. Examples of a floating-point value and a fixed integer are illustrated in FIG. 5A and FIG. 5B, respectively.

The big benefit of using floating-point numbers rather than integers is that floating-point numbers have a greater range for a given number of bits than integers would allow. The trade off, however, for this increased range is a decreased precision, since less bits are used to represent the number (and are instead used to represent the exponent). Floating-point numbers are used in machine learning because both extremely small and extremely large values are encountered frequently, making the larger range of floating-point numbers important. However, while machine learning frequently makes use of both large and small values addressable only with floating-point numbers, for a given machine-learning program, only a much smaller subset of this range will ultimately be utilized. This is inefficient, since the bits used to represent values outside this range are unused.

Furthermore, there is also an additional inefficiency with using floating-point numbers. Modern day machine learning consists of two distinct phases: training and inference. The training phase is simply where the machine learning program is "taught" how to solve whatever problem it is designed for. The inference phase, on the other hand, is where the machine learning program is actually being used. These two phases are quite distinct from one another and have different requirements. During the training phase, precision is very important for the operations being performed, and thus full floating-point numbers desired. However, during the inference phase, precision is less important, and thus fewer bits are necessary. Often, this renders the full precision of floating-point numbers unnecessary. Furthermore, the more bits used to represent a number, the more power expended to perform operations on that number. Thus, using full floating-point numbers is inefficient in these situations. Of course, even during the inference phase a certain level of precision is required, below which the program's accuracy begins to sharply degrade.

Quantization techniques attempt to solve this problem by transforming floating-point values into a k-bit integer, where the smallest integer equals the smallest floating-point value being transformed and the largest integer is the largest floating-point value being transformed. Specifically, quantization is a technique that transforms values from a one-bit representation to another bit representation in a way that maximizes the precision available given the number of bits available in the end representation and minimizes precision losses in the transformation from the start representation. In other words, quantization is used both to transform numbers represented by one bit length to a possibly lower bit length in a way that maximizes precision given the required numerical range. Ultimately, however, quantization in machine learning is a balancing act, since any inference efficiency obtained from using fewer bits leads to reduction in inference accuracy, and vice versa.

As an example of uses of quantization in machine learning, Tensorflow, a popular machine learning framework, takes the simplest approach to quantizing floating-point values into low-precision integers, representing the floating-point values as their closest integer available from the linear set of integers, which are set to be evenly spaced within the range of the minimum and maximum floating-point values present. For example, using 8-bit integers, each floating-point value is compressed as an integer within a linear set of 256, with integer 0 representing the smallest floating-point number, while integer 255 represents the maximum floating-point number. The spacing between each of these integers is the same, being equal to $$\frac{max - min}{2^k}.$$

In formal terms, $\forall x \in$ (min, max), $$\text{let } \alpha = \frac{(max - min)}{2^k - 1},$$

then $\bar{x} = \{\exists i \text{ such that } \alpha^* i \leq (x-min) < \alpha^*(i+1), \text{ return } i\}$ where x is the floating-point number being quantized, $\bar{x}$ is the value of the k-bit integer x is quantized to, max is the largest floating-point number to be quantized, min is the smallest floating-point number to be quantized, and k is the number of bits used for the integer representation.

Another quantization technique called Deep Compression takes a non-linear approach, using a codebook to store a number of centroids representing k-means clustering values. However, centroid initialization has a noticeable drawback on quantization efficiency, because both Forgy initialization and density-based initialization result in very few of the centroids having large absolute values, thereby leading to a poor representation of some large weights in the network. Accordingly, Deep Compression algorithm is also limited to linear initialization to minimize a poor representation of large weights.

Thus, in both these algorithms, as well as all traditional quantization techniques, the spacing between each k-bit integer is equal, distributing numeric resolution evenly distributed across the entire value range. This often leads to accuracy loss during inferencing because the wide, sparse distribution of the utilized floating-point numbers results in reduced resolution for small values, which in turn means quantizing those small values degenerates them. The typical solution to this problem is to use more bits to get higher resolution, which minimizes the problem of degenerating small values, which in turn leads to better inference accuracy. However, both the initial problem of loss-of-accuracy for small floating-point values or the solution of using more bits is inefficient.

The embodiments disclosed herein provide a damped encoding scheme to efficiently quantize neural network models. The scheme not only captures the large weights in the model, but also represents small values with sufficient resolution to better preserve the accuracy. For example, depending on the damping weight, the scheme can act as either an exponential quantization or a linear quantization. Specifically, when the damping weight is less than the maximum quantized value, the scheme acts as an exponential quantization. When the damping factor equals exactly 1, the scheme is similar to the traditional Fibonacci sequence.

As the damping factor varies between these two values, it remains exponential, with a rate of increase greater than a linear function but less than the traditional Fibonacci sequence. This property of the present scheme allows for the ability to dynamically auto-balance the resolution, depending on the maximum and minimum quantized values, making it particularly applicable to quantize various neural network models. It also makes it possible to fine tune or even auto search the damping weight to better adapt the quantization scheme according the characteristic of weight values.

Figure 1:
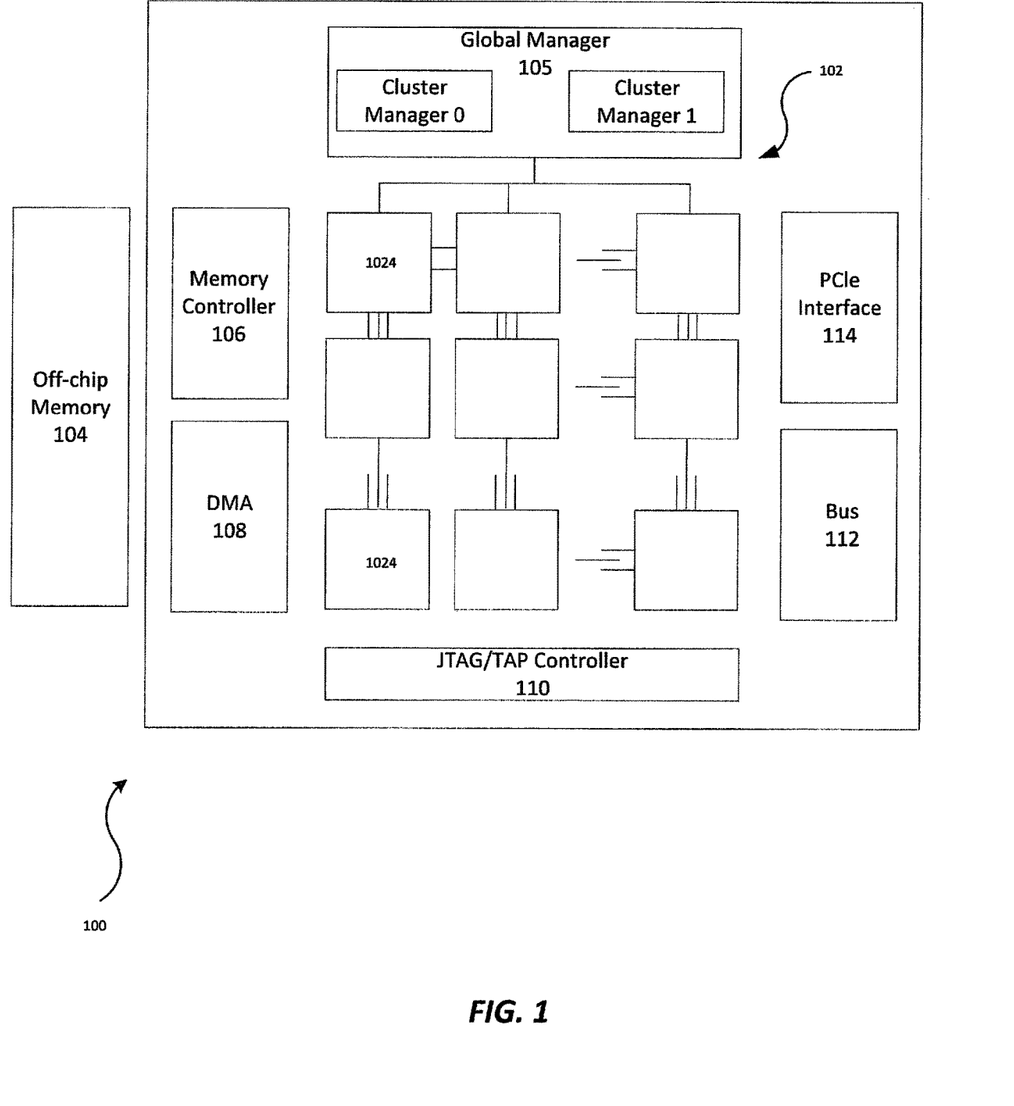
FIG. 1 illustrates an exemplary neural network processing unit chip architecture, consistent with embodiments of the present disclosure.

Some embodiments of the present disclosure are a Neural Network Processing Unit (NPU) architecture implementing the disclosed quantization method, such as the exemplary NPU architecture 100 illustrated in FIG. 1, to accelerate deep learning inferencing. It should be noted that other neural network accelerators such as Graphics Processing Units (GPU) and Field Programmable Gate Arrays (FPGAs), to name just a few, are also suitable to implement the disclosed quantization method.

FIG. 1 illustrates an exemplary architecture 100, according to embodiments of the disclosure. As shown in FIG. 1, architecture 100 can include an on-chip communication system 102, an off-chip memory 104, a memory controller 106, a direct memory access (DMA) unit 108, a Joint Test Action Group (JTAG)/Test Access End (TAP) controller 110, a bus 112, a peripheral interface 114, and similar modules. It is appreciated that on-chip communication system 102 can perform arithmetic operations based on communicated data packets.

Chip communication system 102 can include a global manager 105 and a plurality of compute units 1024. Global manager 105 can include at least one cluster manager to coordinate with the tiles (compute units) 1024. For example, each cluster manager can be associated with an array of compute units that provide synapse/neuron circuitry for the neural network. For example, the top layer of tiles of FIG. 1 may provide circuitry representing an input layer to neural network, while the second layer of tiles may provide circuitry representing one of the hidden layers of the neural network. As shown in FIG. 1, global manager 105 can include two cluster managers to coordinate with two arrays of tiles. Tiles 1024 can include SIMD architecture including one or more multipliers, adders, multiply-accumulators that are configured to perform one or more operations (e.g., arithmetic calculation) on the communicated data packets under the control of global manager 105. To perform the operation on the communicated data packets, tiles 1024 can include at least one core for processing the data packets and at least one buffer for storing the data packets.

Off-chip memory 104 can include read-only memory (ROM), erasable programmable read-only memory (EPROM) or the like. Off-chip memory 104 can be configured to store a large amount of data with slower access speed, compared to the on-chip memory integrated within one or more processor, acting as a higher-level cache.

Memory controller 106 can read, write, or refresh one or more memory devices. The memory devices can include the on-chip memory and the off-chip memory. For example, the memory device can be implemented as any type of volatile or non-volatile memory devices, or a combination thereof, such as those using static random-access memory (SRAM), electrically erasable programmable read-only memory (EEPROM), erasable programmable read-only memory (EPROM), programmable read-only memory (PROM), read-only memory (ROM), magnetic memory, flash memory, or magnetic or optical disk drives.

Memory controller 106 can generate memory addresses and initiate memory read or write cycles. Memory controller 106 can contain several hardware registers that can be written and read by the one or more processor. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of memory controllers.

DMA unit 108 can allow off-chip devices to both on-chip and off-chip memory without causing a CPU interrupt. Thus, DMA unit 108 can also generate memory addresses and initiate memory read or write cycles. DMA unit 108 also can contain several hardware registers that can be written and read by the one or more processor, including a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, and/or other typical features of DMA units.

JTAG/TAP controller 110 is a dedicated debug port implementing a serial communications interface (e.g., a JTAG interface) for low-overhead access to the NPU without requiring direct external access to internal components. The JTAG/TAP controller 110 can also have an on-chip test access interface (e.g., a TAP interface) that implements a protocol to access a set of test registers that present chip logic levels and device capabilities of various parts.

Bus 112 includes both intra-chip bus and inter-chip buses. The intra-chip bus connects all internal components to one another as called for by the system architecture. While not all components are connected to every other component, all components do have some connection to other components they need to communicate with. The inter-chip bus connects the NPU with other devices, such as the off-chip memory or peripherals. Typically, if there is a PCIe interface, that is the inter-chip bus and bus 112 is solely concerned with intra-chip buses, though in some implementations is could still be concerned with specialized inter-bus communications.

Peripheral interface 114 (such as a PCIe interface), if present, serves as an (and typically the) inter-chip bus, providing communication between the NPU and other devices.

While the disclosure above is directed to an NPU architecture, it is appreciated that the damped quantization encoding scheme could be used in any scenario where values are quantized, such as in digital signal processing (DSP).

Figure 2:
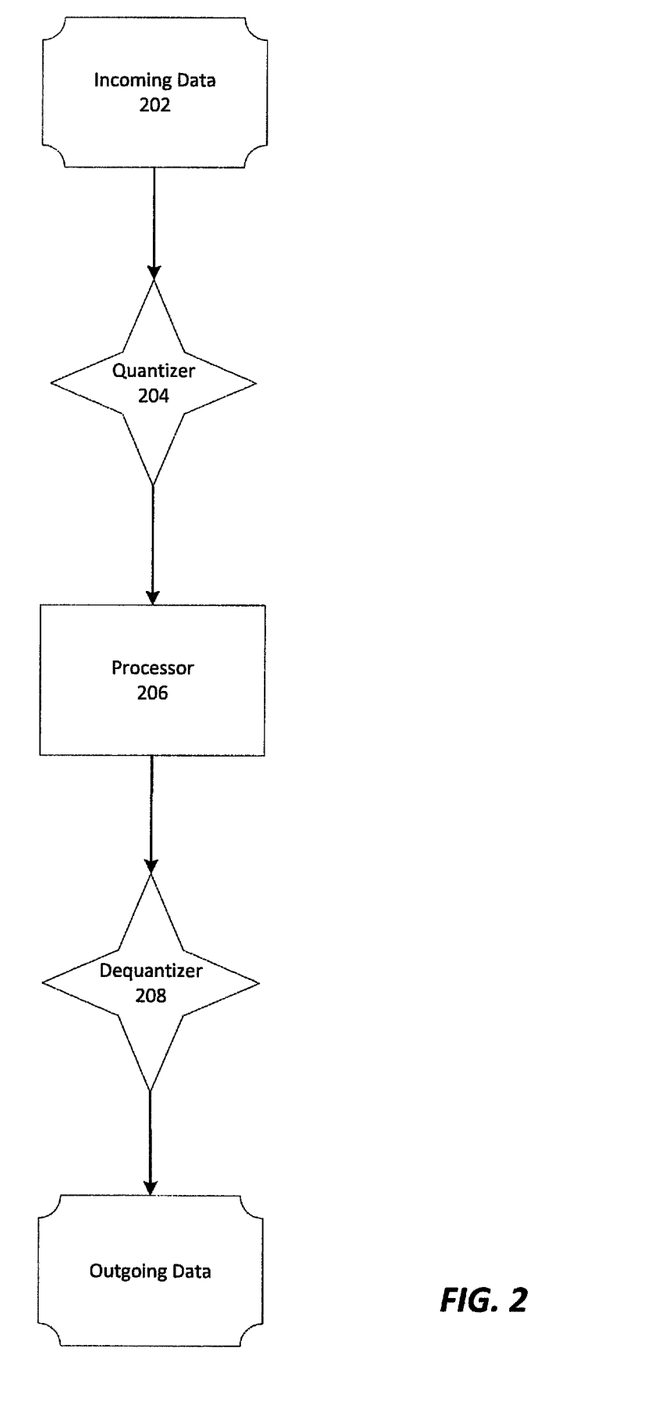
FIG. 2 illustrates an exemplary idealized machine-learning architecture consistent with embodiments of the present disclosure.

Another embodiment of the present disclosure is a generalized machine-learning architecture implementing the disclosed quantization method, illustrated in FIG. 2.

FIG. 2 illustrates an exemplary architecture 200, according to some embodiments of the disclosure. As shown in FIG. 2, architecture 200 works by transparently intercepting incoming data 202 being modified by a processor 206. A damped (DF) Quantizer module 204 intercepts incoming floating-point values and transforms them into smaller bit representations utilizing a damped encoding scheme further described below.

The present disclosure uses an improved damping encoding scheme to quantize neural network models. For example, the embodiments of the present disclosure may use a k-bit quantization scheme where the spacing between adjacent values is not linear, i.e., $$\frac{max - min}{2^k},$$

but rather is exponential. This leads to greater accuracy for small values while still giving a large numerical range, solving both the original inefficiency problem of floating-point numbers while also maintaining precision for small floating-point values.

Specifically, the spacing between values is based on a variant of the Fibonacci recurrence relation called Damped Fibonacci (DF). The $i^{th}$ value of the damped sequence is defined by the formula:

$$DF_i = DF_{i-1} + \left\lceil \frac{1}{N} * DF_{i-2} \right\rceil, \quad \text{(Equation 1)}$$

where N is a chosen damping weight and $$\frac{1}{N}$$

is a damping factor and $\lceil \ \rceil$ indicates a ceiling operation. Using the damped sequence to quantize a given set of floating-point numbers to k-bit integers, the value associated with each k-bit integer $Int_i$, $0 \leq i < (2^k - 1)$ is $DF_i$, where $DF_i$ is the $i^{th}$ element of the damped sequence determined according to Equation 1. This means the gap between the damped sequence value indexed by the $i^{th}$ k-bit integer and the damped sequence value indexed by the $i^{th}+1$ k-bit integer is $DF_{i+1} - DF_i$. For an N of 1, the gap size grows exponentially, with growth commensurate to exponential growth at a rate equal to the golden ratio, i.e., $$\frac{1 + \sqrt{5}}{2}.$$

The Fibonacci recurrence relation is used to construct a Fibonacci sequence, where a next value after the first two in the sequence is derived as a sum of previous two values, for which the first two values are, by definition, 0 and 1: $F_i = F_{i-1} + F_{i-2}$. For example, the first values of the Fibonacci sequence are: 0, 1, 1, 2, 3, 5, 8, 13, 21, 34 . . . .

The present disclosure can use a modified version of the Fibonacci recurrence relation to create a damped sequence to efficiently quantize neural network models. One of the advantages of using the damped sequence is that it addresses the previous mentioned problems of traditional quantization methods, effectively representing not only the large values in a model, but also retaining sufficient resolution for small values to preserve their accuracy and thus the overall accuracy of the model.

Equation (1) above is an exemplary formula used to generate the damped sequence, according to embodiments of the present disclosure. Depending on the damping weight (N), the scheme can act as either an exponential quantization or a linear quantization. Specifically, when the damping weight is less than the maximum k-bit value, the scheme acts as an exponential quantization. When the damping weight equals exactly 1, the scheme is similar to the traditional Fibonacci sequence. As the damping weight varies between these the maximum k-bit value and 1, the sequence is exponential, with a rate of increase greater than a linear function but smaller than the traditional Fibonacci sequence. However, as the damping weight increases past the maximum k-bit value, the sequence becomes asymptotically more linear. This property of the present scheme allows for the ability to dynamically auto-balance the resolution, depending on the maximum and minimum quantized values, making it particularly applicable to quantize various neural network models. It also makes it possible to fine tune or even auto search the damping weight to better adapt the quantization scheme according the characteristic of weight values.

As shown in Table 1 below, when the damping weight N is equal to 1, the damped sequence is similar to the traditional Fibonacci sequence. As the damping weight N increases to 2, however, the sequence is damped and does not increase as quickly.

TABLE 1

| i | $DF_i$ for k = 3, N = 1 | $DF_i$ for k = 3, N = 2 |
|---|---|---|
| 0 | 1 | 1 |
| 1 | 1 | 1 |
| 2 | 2 | 2 |
| 3 | 3 | 3 |
| 4 | 5 | 4 |
| 5 | 8 | 6 |
| 6 | 13 | 8 |
| 7 | 21 | 11 |

In contrast to the original Fibonacci sequence, the next value, $DF_i$, in the damped sequence is a sum of previous value $DF_{i-i}$ and damped prior previous value $DF_{i-2}$. The reciprocal of the damping weight N gives a damping factor. Further, the ceiling of the damping factor $$\left( \frac{1}{N} \right)$$

multiplied by the damped prior previous value $DF_{i-2}$. This ceiling operation rounds up the product to make it an integer value. Assuming that the weighted values fall in the range of (min, max), each floating-point value of x within the range is quantized as:

$$\forall x \in (min, max), \text{ let } \alpha = \frac{(max - min)}{DF(2^k - 1)}, \text{ then} \quad \text{(Equation 2)}$$

$$\overline{x} = \{\exists i \text{ such that } \alpha * DF(2^i - 1) \leq (x - min) < \alpha * DF(2^i), \quad \text{(Equation 3)}$$
$$\text{return } (2^i - 1)\}$$

where $\alpha$ is a normalization factor. Considering the placement of $\alpha$, it is appreciated that Equation 3 can also be represented as:

$$\overline{x} = \left\{ \exists i \text{ such that } DF(2^i - 1) \leq \frac{x - min}{\alpha} < DF(2^i), \text{ return } (2^i - 1) \right\}$$

Therefore, where the adjacent values of the damped value sequence are the same number, the lower index is used for quantization.

In some embodiments, the k-bits, normalization fact, or damped value sequence may be computed offline and stored in memory such that a table (such as table 1) would be stored in memory for later access during quantization.

For a k-bit quantization, there are a total of $2^k$ values in the damped sequence. Furthermore, once a damping factor is chosen, this sequence can be pre-calculated. Since the damped sequence is monotonically increased, it thus takes only O(lgn) time to search for the range in the sequence where x falls, so the time complexity of quantization a value is only O(k). Comparing with traditional quantization, where the $2^k$ bits represent a scaled linear range, the damped sequence uses the number in the linear set to index the damped sequence.

For a k-bit quantization, the maximum number in the linear set is $2^k-1$. Accordingly, the smallest resolution for the quantized values is $$\frac{1}{2^k},$$

For the damped encoding scheme, the maximum value is $DF(2^k-1)$, which is much larger than the linear set value of $2^k-1$ (assuming the damping factor is near to 1). So, resolution for small quantized values using the damped sequence is much greater than the resolution using linear quantization. This helps prevent small weight values from being degenerated during quantization, and thus better preserves inference accuracy. At the same time, large weight values are relatively dispersed after quantization (close to the far-right end of a damped sequence graph), but since only the most significant digits of large weights matter, the overall effective resolution of quantization using the damped sequence is often better than, but never worse than, the resolution of linear quantization.

Referring back to FIG. 2, DF Quantizer module provides the quantized data to a processor 206 that expects this bit representation, where various operations are then performed. The processor 206 could be a variety of computing devices, such as the NPU disclosed in FIG. 1, or the multiply add operation disclosed in FIG. 3. Finally, when the operations are performed, the outgoing data 210 is transparently converted back into the closest floating-point value with the DF Dequantizer 208.

In some variants, intermediary values are not immediately dequantized, allowing them to be stored quantized for use in later operations. In this circumstance, the quantized data would be stored back into memory just like any other data. When the data is finished being processed or being sent back to the requesting process, the DF Dequantizer 208 would then finally dequantize the data. This avoids inefficiency from repeated quantization.

In other variants, a module is used to modify a neural network so that all value representations are in a more efficient bit representation. Therefore, rather than intercepting the values before and processing them afterwards, the entire program is modified once, and thereafter natively uses the new bit representation.

Figure 3:
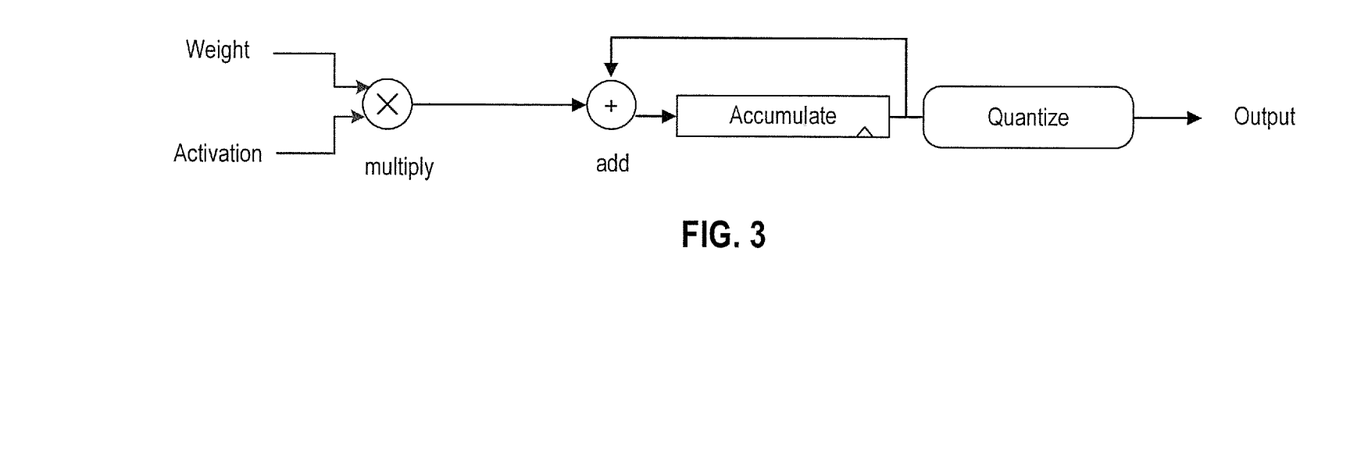
FIG. 3 illustrates an exemplary fused multiply-add circuit consistent with embodiments of the present disclosure.

FIG. 3 illustrates a multiply-accumulate operation using the damped encoding scheme, consistent with embodiments of the present disclosure. As shown in FIG. 3, the disclosed encoding scheme may be used during a fused multiply-add operation, common to machine learning applications, to maintain a value at a certain number of bits while retaining reasonable precision. The scenario provided in FIG. 3 is just one example of how the damped encoding quantization scheme can be implemented, and it is appreciated that the damped encoding quantization scheme can be applied in other scenarios, such as earlier or later in the operation based on the configuration of the machine learning application. For example, the weight or the output of the multiplication shown in FIG. 3 could be quantized.

Figure 4:
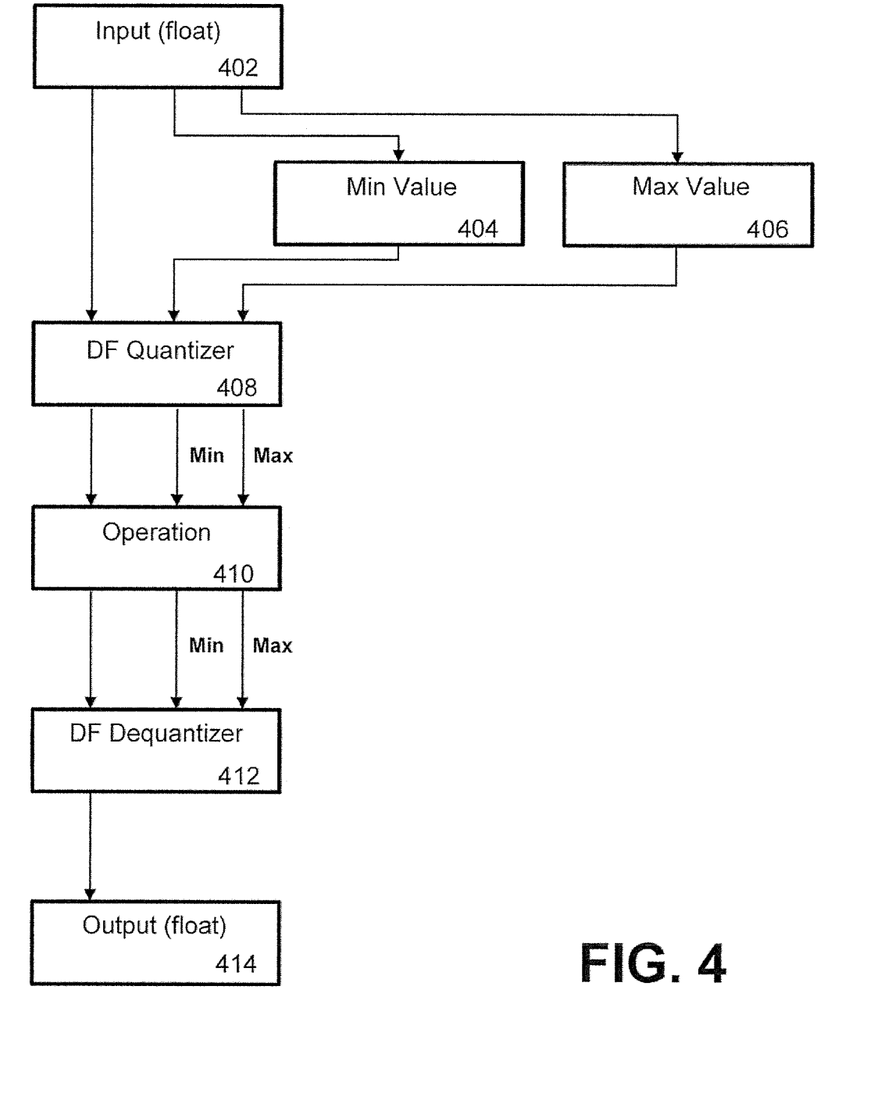
FIG. 4 illustrates an exemplary idealized process of quantizing values, consistent with embodiments of the present disclosure.

FIG. 4 illustrates a high-level overview of some embodiments. As shown in FIG. 4, a floating-point value 402 can be sent to a processing unit for an operation 410 to be performed. Additionally, as shown in FIG. 4, a maximum floating-point value and a minimum floating-point value may also be sent to the processing unit so that the operation 410 may be performed on floating-point value 402. The floating-point value, as well as the maximum and minimum floating-point values, can be stored in a register in a format similar to the format shown in FIG. 5A. Before getting to the processor for the operation 410, however, floating-point values 402, 404, and 406 are acquired by DF quantizer 408. It is appreciated that the floating-point values may be stored remotely from DF quantizer 408 or in DF quantizer 408 (e.g., in a register of DF quantizer 408 or an FPGA memory of DF quantizer 408).

DF quantizer 408 can be hardware component (e.g., an integrated circuit such as a field programmable gate array (FPGA)), a software component, or a combination thereof for quantizing incoming floating-point values. DF quantizer 408 can include one or more logic blocks or cells (such as circuitry of an FPGA or an integrated circuit). For example, DF quantizer 408 can include a logic block for determining the value of the normalization factor using the computation according to Equation 2. Moreover, DF quantizer 408 can include a logic block for determining the quantized value using the computations according to the variations of Equation 3. As mentioned above, DF quantizer 408 can include one or more memories for storing floating-point values and information related to the damped value sequence (e.g., such as a stored representation of Table 1) based on the damping weight.

Using the floating-point values, DF quantizer 408 then quantizes the incoming floating-point value 402 using the minimum and maximum floating-point values 404 and 406. The quantized values can be fixed point representations, such as the exemplary dynamic fixed point representation shown in FIG. 5B, wherein these quantized values can be stored in the NPU.

After quantization, the processor can then perform the designated one or more operations. At some point thereafter, the values generated by the one or more operations can then be dequantized by DF Dequantizer 412, which can output one or more corresponding a floating-point values 414.

FIG. 5A illustrates an exemplary representation of a 32-bit floating-point number. In some embodiments, as shown in FIG. 5A, a 32-bit floating-point value may be stored in memory using the structure of one bit for the sign, eight bits for the exponent, and the remaining 23 bits for the mantissa. It may be desired to quantize this floating-point value as a fixed point integer as shown in FIG. 5B in order to perform certain operations on the value. For example, in traditional machine learning models, the weights utilized are usually within a numeric range much smaller than the available numeric range of floating-point values. Therefore, in order to increase efficiency in computation, the 32-bit floating-point value may be quantized and represented by an 8-bit fixed point integer as shown in FIG. 5B. For example, as shown in FIG. 5B, an 8-bit fixed point integer may be stored in memory using the structure of one bit for the sign and the remaining seven bits for the mantissa.

Figure 6:
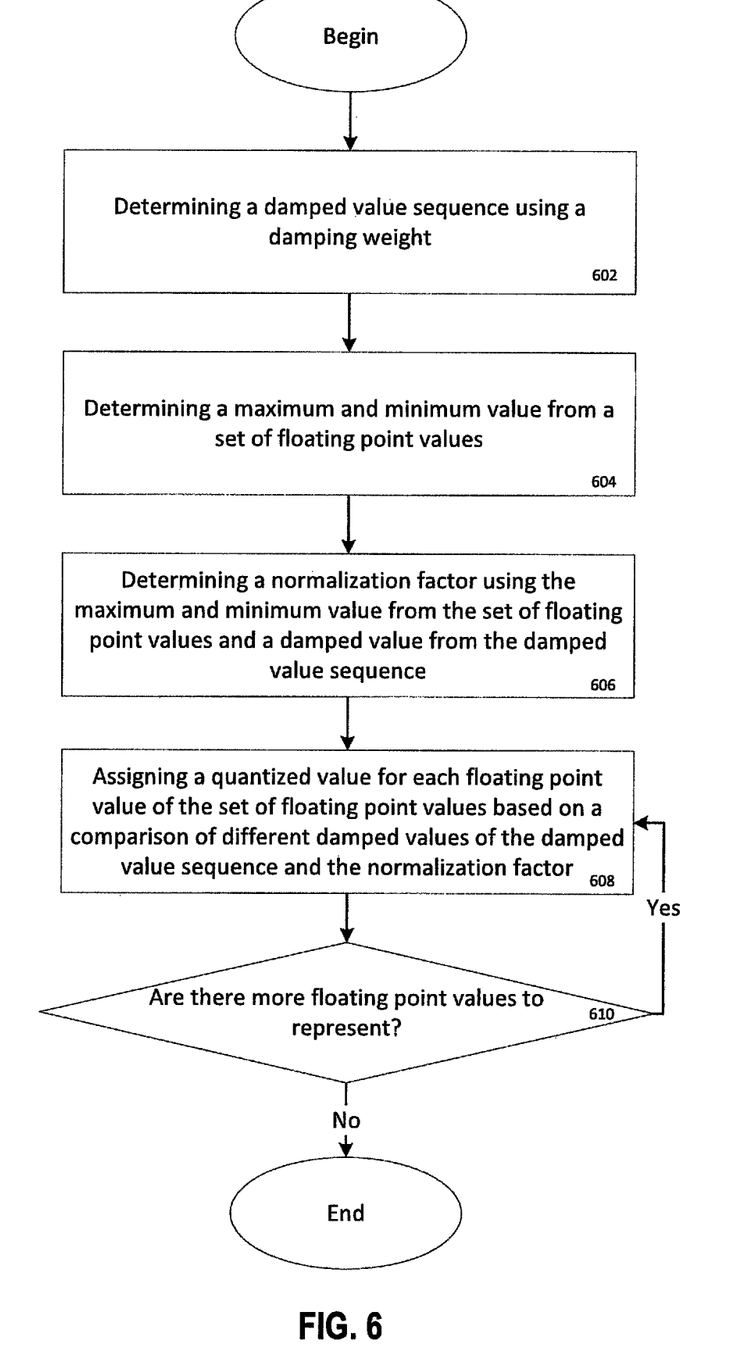
FIG. 6 illustrates a flow chart providing an exemplary method for quantizing a set of floating-point values, consistent with embodiments of the present disclosure.

FIG. 6 illustrates a flow chart providing an exemplary method for quantizing a set of floating-point values, consistent with some embodiments of this disclosure. Referring to FIG. 6, the method includes the following steps.

In step 602, a processing unit determines a damped value sequence using a damping weight. For example, the damping weight may be determined based on weight values (e.g., such as floating-point values) associated with a machine learning model. This allows the implemented method to be changed dynamically based on the weight values of the current model leading to higher predictability and accuracy of results. This damping weight is then used to determine a damped value sequence according to an equation such as Equation 1 above. In some embodiments, the damped value sequence may be determined before implementing the method and stored in memory for later access.

In step 604, a processing unit determines maximum and minimum values from a set of floating-point values. For example, there may be a set of floating-point values desired to be converted to quantized values for subsequent computation. The processing unit may evaluate this set of floating-point values to determine a maximum floating-point value and minimum floating-point value from the set of floating-point values.

In some embodiments, the maximum and minimum floating-point values may be determined before implementing the method and stored in memory for later access.

In step 606, a processing unit determines a normalization factor using the maximum and minimum floating-point values from the set of floating-point values and a damped value from the damped value sequence. For example, the processing unit may determine the normalization factor according to an equation such as Equation 2 above.

In some embodiments, the damped value from the damped value sequence corresponds with the largest damped value in the damped value sequence, such as $DF(2^k-1)$. The quantized values can be normalized using the damped value sequence to improve the efficiency and accuracy of later computation.

In some embodiments, the processing unit may determine the k-bits and the normalization factor offline and store the k-bits and normalization factor in memory for future use. For example, the processing unit may determine the k-bits according to $2^k-1$ and determine the normalization factor according to an equation such as Equation 2 above and store the k-bits and the normalization factor in memory for future use.

In step 608, a processing unit assigns a quantized value for each floating-point value of the set of floating-point values based on a comparison of different damped values of the damped value sequence and the normalization factor. For example, the processing unit may compare the floating-point values to adjacent damped values of the damped value sequence using the normalization factor to determine which damped value of the damped value sequence best represents the given floating-point value. This comparison may be performed using, for example, the implementations of Equation 3 above.

In some embodiments, the processing unit first normalizes the floating-point value to the range of damped values according to an equation such as the second implementation of Equation 3. The normalized floating-point value is then compared to adjacent damped values of the damped value sequence to determine which damped value of the damped value sequence best represents the given floating-point value.

In some embodiments, the damped values are computed according to an equation such as the second implementation of Equation 3 prior to quantization and stored for future use. For example, the processing unit may first normalize the floating-point value, using a predetermined normalization factor, to the range of the damped values and may subsequently compare the normalized floating-point value with the pre-stored values of the damped value sequence indexed by the k-bits to determine which damped value of the damped value sequence best represents the given floating-point value.

In step 610, the processing unit checks if there are more floating-point values to represent as damped values of the damped value sequence. For example, the processing unit may loop through the floating-point values, making the comparison and subsequent assignation for each floating-point value according to step 608. The processing unit may then check if there are more floating-point values to compare and assign before ending the method.

It is appreciated that the embodiments described herein could be incorporated on hardware, software, or a combination of both hardware and software. For example, it is appreciated that global manager 105 of the NPU architecture shown in FIG. 1 could use software to control the configuration of the DF Quantizer described above. For example, the global manager may send instructions to the DF Quantizer to update the value of the damping weight. The software may be stored on a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Program code embodied on a computer readable medium may be transmitted using any appropriate medium, including but not limited to wireless, wireline, optical fiber cable, RF, IR, etc., or any suitable combination of the foregoing.

Computer program code for carrying out operations for example embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Example embodiments are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a hardware processor core of a computer, other programmable data processing apparatus, or other devices to function in a particular manner, such that the instructions stored in the computer readable medium form an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate examples of the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

It should be understood that the steps of the example methods set forth herein are not necessarily required to be performed in the order described, and the order of the steps of such methods should be understood to be merely example. Likewise, additional steps may be included in such methods, and certain steps may be omitted or combined, in methods consistent with various embodiments.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In the foregoing disclosure, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A method for performing an operation of quantizing weights and values of a machine learning model during an inference phase of the machine learning model, the method comprising:
    acquiring a set of floating-point values of the weights and values of the machine learning model before the set of floating-point values being processed by a processor for performing the operation;
    acquiring a normalization factor determined using the set of floating-point values and a damped value of a damped value sequence, wherein the damped value sequence comprises a plurality of damped values, and spacings between adjacent damped values in the damped value sequence are non-linear;
    assigning a quantized value for each floating-point value of the set of floating-point values based on the damped value sequence and the normalization factor, wherein the damped value sequence is computed based on a damped Fibonacci recurrence relationship and a damping weight; and
    sending the quantized value to the processor for performing the operation of quantizing the weights and values of the machine learning model.

2. The method of claim 1, further comprising determining the damped value from the damped value sequence using the damped value sequence and a number of quantization bits.

3. The method of claim 2, wherein determining the damped value from the damped value sequence comprises using the largest damped value from the damped value sequence based on the number of quantization bits.

4. The method of claim 1, wherein assigning the quantized value for the each floating-point value of the set of floating-point values comprises:
    assigning the quantized value for the each floating-point value in the set of floating-point values based on a comparison of adjacent damped values of the damped value sequence using the normalization factor.

5. The method of claim 1, wherein the damped value sequence is computed based on $$DF_i(\text{Original}) = DF_{i-1} + \left[\frac{1}{N} * DF_{i-2}\right],$$

wherein N is a damping weight.

6. The method of claim 1, wherein the normalization factor is determined using a maximum value from the set of floating-point values, a minimum value from the set of floating-point values, and the damped value.

7. The method of claim 6, wherein the normalization factor is determined based on:

$$\alpha = \frac{(\max - \min)}{DF(2^k - 1)},$$

wherein $\alpha$ is the normalization factor, max is the maximum value, min is the minimum value, k is a number of quantization bits, and DF $(2^k-1)$ is the damped value.

8. The method of claim 6, wherein assigning the quantized value for the each floating-point value of the set of floating-point values is based on one of $$\bar{x} = \{\exists i \text{ such that } \alpha * DF(2^i - 1) \leq (x - \min) < \alpha * DF(2^i), \text{ return } (2^i - 1)\},$$

or $$\bar{x} = \left\{\exists i \text{ such that } DF(2^i - 1) \leq \frac{x - \min}{\alpha} < DF(2^i), \text{ return } (2^i - 1)\right\},$$

wherein $\bar{x}$ is the quantized value, $\alpha$ is the normalization factor, x is a floating-point value from the set of floating-point values, min is the minimum value, and $DF(2^i-1)$ and $DF(2^i)$ are adjacent damped values of the damped value sequence.

9. A non-transitory computer-readable medium that stores a set of computer executable instructions that are executable by a processor of a device to cause the device to perform a method for performing an operation of quantizing weights and values of a machine learning model during an inference phase of the machine learning model, the method comprising:
    acquiring a set of floating-point values of the weights and values of the machine learning model before the set of floating-point values being processed by a processor for performing an operation in the inference phase;
    acquiring a normalization factor determined using the set of floating-point values and a damped value of a damped value sequence, wherein the damped value sequence comprises a plurality of damped values, and spacings between adjacent damped values in the damped value sequence are non-linear;
    assigning a quantized value for each floating-point value of the set of floating-point values based on the damped value sequence and the normalization factor, wherein the damped value sequence is computed based on a damped Fibonacci recurrence relationship and a damping weight; and
    sending the quantized value to the processor for performing the operation of quantizing the weights and values of the machine learning model.

10. The computer-readable medium of claim 9, wherein the set of computer executable instructions that are executable by the processor of the device to cause the device to further perform:
    determining the damped value from the damped value sequence using the damped value sequence and a number of quantization bits.

11. The computer-readable medium according to claim 10, wherein determining the damped value from the damped value sequence comprises using the largest damped value from the damped value sequence based on the number of quantization bits.

12. The computer-readable medium according to claim 9, wherein assigning the quantized value for the each floating-point value of the set of floating-point values comprises:
    assigning the quantized value for the each floating-point value in the set of floating-point values based on a comparison of adjacent damped values of the damped value sequence using the normalization factor.

13. The computer readable medium according to claim 9, wherein the damped value sequence is computed based on $$DF_i(\text{Original}) = DF_{i-1} + \left\lceil \frac{1}{N} * DF_{i-2} \right\rceil,$$

wherein N is a damping weight.

14. The computer-readable medium according to claim 9, wherein the normalization factor is determined using a maximum value from the set of floating-point values, a minimum value from the set of floating-point values, and the damped value.

15. The computer-readable medium according to claim 14, wherein the normalization factor is determined based on:

$$\alpha = \frac{(\max - \min)}{DF(2^k - 1)},$$

wherein $\alpha$ is the normalization factor, max is the maximum value, min is the minimum value, k is a number of quantization bits, and DF $(2^k-1)$ is the damped value.

16. The computer readable medium according to claim 14, wherein assigning the quantized value for the each floating-point value of the set of floating-point values is based on one of $$\bar{x} = \{\exists i \text{ such that } \alpha * DF(2^i - 1) \leq (x - \min) < \alpha * DF(2^i), \text{ return } (2^i - 1)\},$$

or $$\bar{x} = \left\{\exists i \text{ such that } DF(2^i - 1) \leq \frac{x - \min}{\alpha} < DF(2^i), \text{ return } (2^i - 1)\right\},$$

wherein $\bar{x}$ is the quantized value, a is the normalization factor, x is a floating-point value from the set of floating-point values, min is the minimum value, and $DF(2^i-1)$ and $DF(2^i)$ are adjacent damped values of the damped value sequence.

17. A quantizer for performing an operation of quantizing weights and values of a machine learning model during an inference phase of the machine learning model, the quantizer comprising:
    one or more memories configured to store one or more floating-point values of a set of floating-point values of the weights and values of the machine learning model, and a normalization factor determined using the set of floating-point values and a damped value of a damped value sequence, wherein the damped value sequence comprises a plurality of damped values, and spacings between adjacent damped values in the damped value sequence are non-linear; and quantization circuitry configured to:
acquire the normalization factor and the one or more floating-point values from the one or more memories before the one or more floating-point values being processed by an apparatus for performing the operation in the inference phase;
assign a quantized value for each floating-point value of the set of floating-point values based on the damped value sequence and the normalization factor, wherein the damped value sequence is computed based on a damped Fibonacci recurrence relationship and a damping weight; and
send the quantized value to the apparatus for performing the operation of quantizing the weights and values of the machine learning model.

18. The quantizer of claim 17, wherein the damped value from the damped value sequence is determined using the damped value sequence and a number of quantization bits.

* * * * *